United States Patent
Chen

(10) Patent No.: US 9,004,735 B2
(45) Date of Patent: Apr. 14, 2015

(54) BACKLIGHT MODULE HAVING UNIFORM LIGHT EMISSION

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/869,904

(22) Filed: Apr. 24, 2013

(65) Prior Publication Data

US 2014/0140098 A1    May 22, 2014

(30) Foreign Application Priority Data

Nov. 20, 2012  (TW) .............................. 101143348 A

(51) Int. Cl.
*F21V 8/00* (2006.01)

(52) U.S. Cl.
CPC .............. *G02B 6/002* (2013.01); *G02B 6/0016* (2013.01)

(58) Field of Classification Search
USPC ........ 362/621, 628, 612, 622, 623, 97.1–97.4
See application file for complete search history.

(56) References Cited

U.S. PATENT DOCUMENTS

| | | | | |
|---|---|---|---|---|
| 7,517,127 B2 * | 4/2009 | Takada | ......................... | 362/608 |
| 7,884,896 B2 * | 2/2011 | Park | ............................... | 349/65 |
| 8,057,086 B2 * | 11/2011 | Kim et al. | ..................... | 362/612 |
| 2002/0044436 A1 * | 4/2002 | Ohkawa | ......................... | 362/31 |

* cited by examiner

*Primary Examiner* — Bao Q Truong
(74) *Attorney, Agent, or Firm* — Novak Druce Connolly Bove + Quigg LLP

(57) ABSTRACT

A backlight module includes a light guide plate and only one light source. The light guide plate has a main body and protrusions. The main body has a light emitting surface, a light incident surface, a first side surface, and a second side surface. The protrusions are positioned on the light incident surface, and face the light source. The protrusions diffuse the light rays from the only one light source and guides the light rays into the main body. The light emitting surface has a light emitting area and a marginal area surrounding the light emitting area. The marginal area has a light diffusion area adjacent to the light incident surface and the first side surface. An included angle between the light incident surface and the first side surface is an obtuse angle. An included angle between the light incident surface and the second side surface is an obtuse angle.

7 Claims, 4 Drawing Sheets

BACKLIGHT MODULE HAVING UNIFORM LIGHT EMISSION

BACKGROUND

1. Technical Field

The present disclosure relates to a backlight module having uniform light emission and only one light source.

2. Description of Related Art

Currently, in a backlight module, a light incident surface of a light guide plate is greater than a luminance area of a single light source (such as a light emitting diode). Therefore, a portion of the light incident surface cannot receive the light rays. To overcome this problem, a number of light sources need to be positioned on a same side of the light incident surface to make sure the brightness distribution of a light emitting surface of the light guide plate is uniform, which will need more electrical energy.

Therefore, it is desirable to provide a backlight module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
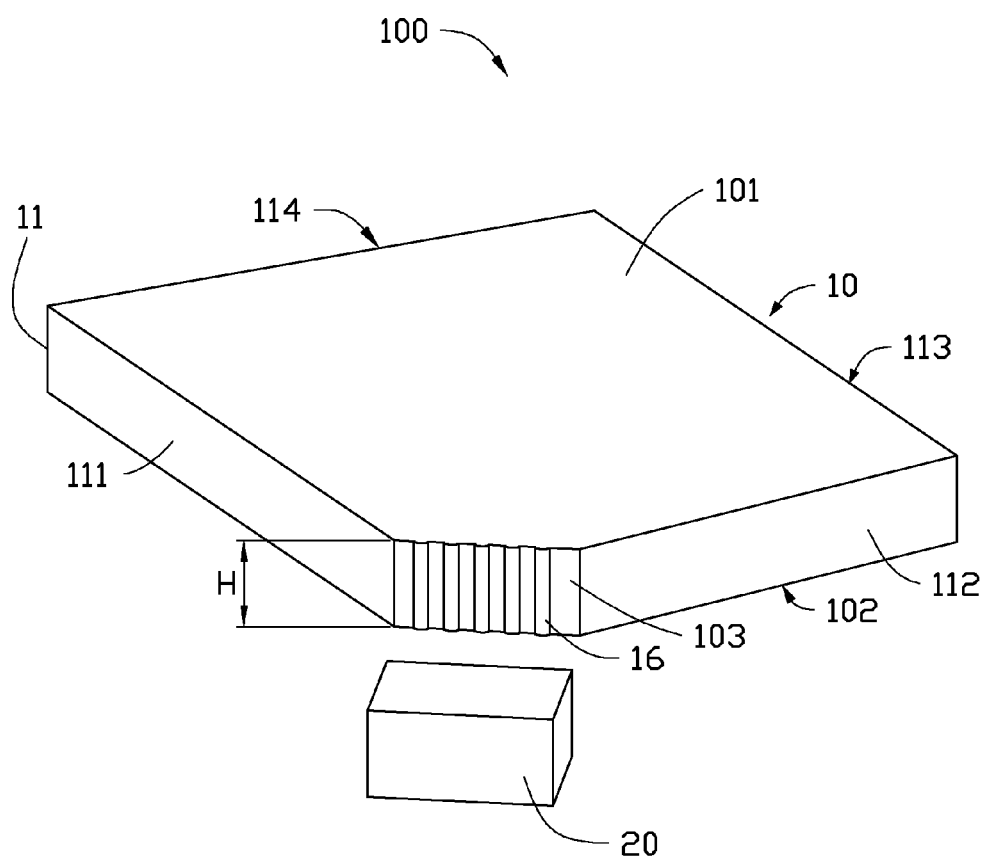
FIG. 1 is a schematic view of a backlight module, according to an exemplary embodiment, wherein the backlight module includes a number of protrusions.
Figure 2:
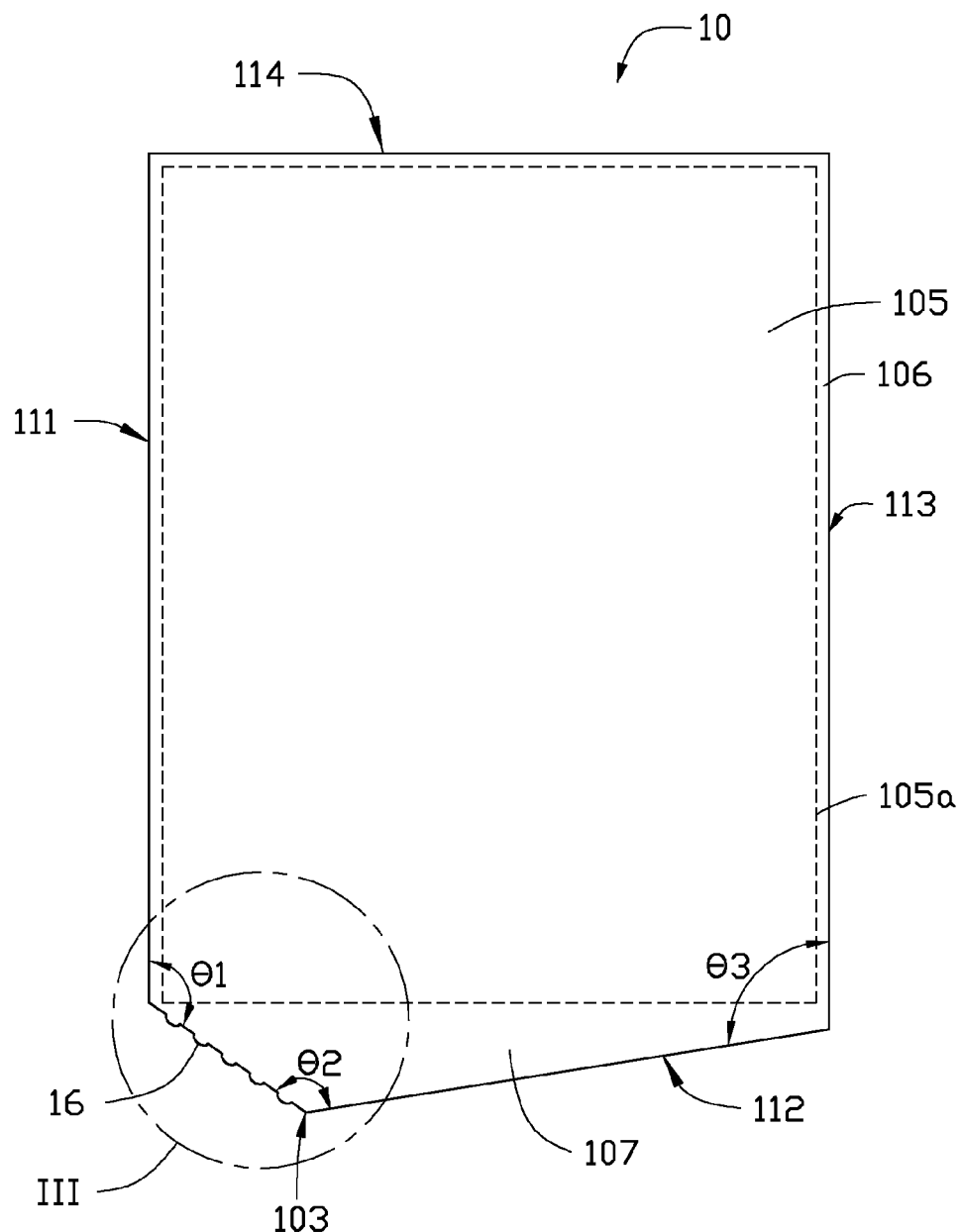
FIG. 2 is a schematic top view of the backlight module of FIG. 1.

FIG. 1 and FIG. 2 illustrate a backlight module 100 in accordance with an embodiment. The backlight module 100 includes a light guide plate 10 and only one light source 20. In the embodiment, the light source 20 is a light emitting diode.

The light guide plate 10 is made of transparent material, such as acrylic resin or polyethylene resin. The light guide plate 10 includes a main body 11 and a number of protrusions 16. The main body 11 is pentagonal prism shaped, and includes a light emitting surface 101, a back surface 102, a light incident surface 103, a first side surface 111, a second side surface 112, a third side surface 113, and a fourth side surface 114. The back surface 102 is parallel to the light emitting surface 101. The light incident surface 103, the first side surface 111, the second side surface 112, the third side surface 113, and the fourth side surface 114 are perpendicular to the light emitting surface 101 and the back surface 102. The light incident surface 103 is connected to the first side surface 111 and the second side surface 112.

An included angle θ1 formed between the light incident surface 103 and the first side surface 111 is an obtuse angle. An included angle θ2 formed between the light incident surface 103 and the second side surface 112 is an obtuse angle. The third side surface 113 is parallel with the first side surface 111, and is connected to the second side surface 112. An included angle θ3 formed between the third side surface 113 and the second side surface 112 is an obtuse angle. The fourth side surface 114 is perpendicular to the first side surface 111 and the third side surface 113. In the embodiment, θ1 is about 125 degrees, θ2 is about 136 degrees, and θ3 is about 99 degrees.

The light emitting surface 101 has a light emitting area 105 and a marginal area 106 around the light emitting area 105. The light emitting area 105 is substantially rectangular, and has four edges 105a. Three of the four edges 105a are parallel to the first side surface 111, the third side surface 113, and the fourth side surface 114 respectively. The marginal area 106 further has a light diffusion area 107 adjacent to the light incident surface 103 and the second side surface 112.

Figure 3:
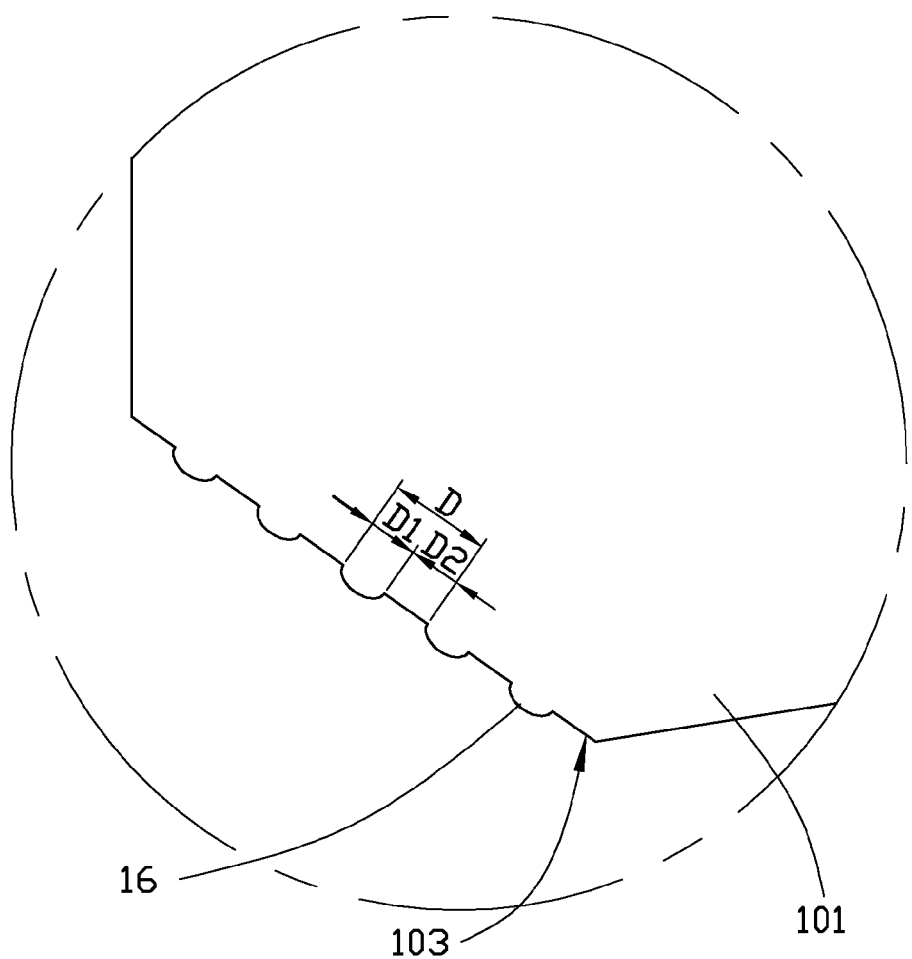
FIG. 3 is a schematic, enlarged view of a circled portion III of the backlight module of FIG. 2.
Figure 4:
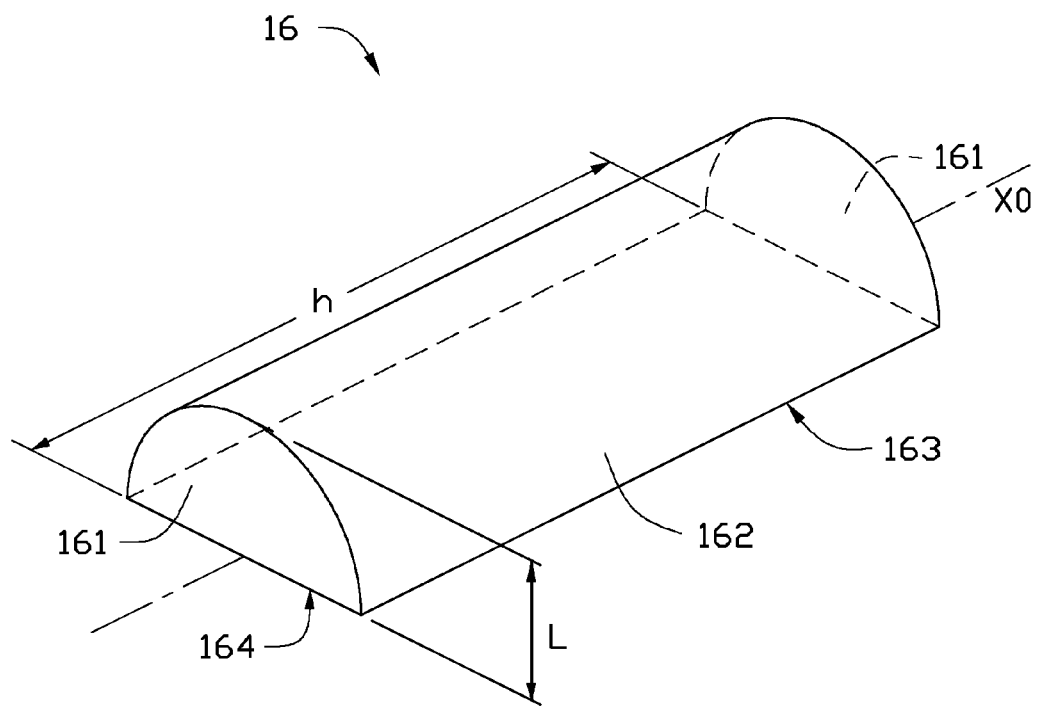
FIG. 4 is a schematic view of each of the protrusions of the backlight module of FIG. 1.

Also referring to FIGS. 3 and 4, the protrusions 16 are positioned on the light incident surface 103, and are evenly spaced apart from each other. In the embodiment, the protrusions 16 and the main body 11 are integrally formed. Each protrusion 16 is less semi-cylindrical shaped or semi-cylindrical shaped.

Each protrusion 16 has two opposite bottom surfaces 161, an arc-shaped circumferential surface 162, and a fixing surface 163 opposite to the circumferential surface 162. Both of the circumferential surface 162 and the fixing surface 163 are connected to the two bottom surfaces 161. The fixing surface 163 is a flat surface, and is positioned on the light incident surface 103. A central axis of each protrusion 16 is perpendicularly connected to the light emitting surface 101. The central axis extends along the height direction of each protrusion 16. The height h of each protrusion 16 is substantially equal to the thickness H of the light incident surface 103 along a direction perpendicular to the light emitting surface 101. A maximum distance between the circumferential surface 162 and the fixing surface 163 is L. In this embodiment, the diameter of the bottom surface 161 is 97.5 micro meters (μm), h=450 μm'L=60 μm.

Each bottom surface 161 has a bottom edge 164. The bottom edge 164 is an intersection between each bottom surface 161 and the corresponding fixing surface 163. The length of the bottom edge 164 is D1, a distance between each two adjacent protrusions 16 is D2, and the period D of the protrusions 16 is a sum of the length of each bottom edge 164 and the distance between each two adjacent protrusions 16, wherein 190 μm≤D<280 μm.

The light sources 20 face the protrusions 16. The protrusions 16 are used for diffusing the light rays from the light source 20, and guiding most of the light rays into the main body 11. The light rays entering the light guide plate 10 are reflected many times in the light diffusion area 107, and thus the light rays emitted from the light emitting area 105 are distributed uniformly. The back surface 102 is used for internally reflecting the light rays in the main body 11. The light emitting area 11 transmits a portion of the light rays incident thereon to the exterior above the main body 11, and reflects the other portion of the light rays incident thereon back into the main body 11. The first side surface 111, the second side surface 112, the third side surface 113, and the fourth side surface 114 are used for respectively reflecting the light rays in the main body 11.

Tests show that the brightness of a central portion of the light emitting area 105 is low when D=180 um, the brightness of a marginal portion of the light emitting area 105 is low when D=280 um, and the brightness of the light emitting area 105 is uniform when 190 μm≤D<280 μm.

By employing the backlight module 100, the brightness of the light emitting area 105 is uniform, and because the backlight module 100 has only one light source 20, and thus the electrical power is reduced.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A backlight module, comprising:

only one light source configured for emitting light rays; and a light guide plate made of transparent material, and comprising:

a main body comprising:

a first side surface;

a second side surface;

a light incident surface connecting to the first side surface and the second side surface; and a light emitting surface substantially perpendicular to the light incident surface, the light emitting surface comprising a light emitting area and a marginal area surrounding the light emitting area; wherein the marginal area has a light diffusion area adjacent to the light incident surface and the first side surface; an included angle between the light incident surface and the first side surface is obtuse angle, an included angle between the light incident surface and the second side surface is an obtuse angle; and a plurality of protrusions positioned on the light incident surface, and facing the only one light source, the protrusions being configured for diffusing the light rays from the only one light source, and guiding the light rays into the main body, wherein each of the plurality of protrusions comprises two opposite bottom surfaces, an arc-shaped circumferential surface, and a fixing surface opposite to the circumferential surface, both of the circumferential surface and the fixing surface are connected to the two bottom surfaces, the fixing surface is a flat surface, and is positioned on the light incident surface, an intersection of each of the bottom surfaces and the light incident surface is a bottom edge, a period "D" of the plurality of protrusions is a sum of a length of the bottom edge and a distance between each two adjacent protrusions, and 190 µm≤D<280 µm.

2. The backlight module of claim 1, wherein a central axis of each of the protrusions is substantially perpendicular to the light emitting surface, the central axis extends along a height direction of the protrusions, and the height of each of the protrusions is substantially equal to a height of the light incident surface along a direction perpendicular to the light emitting surface.

3. The backlight module of claim 1, wherein each of the protrusions is less semi-cylindrical shaped or semi-cylindrical shaped.

4. The backlight module of claim 1, wherein the main body comprises a back surface opposite to the light emitting surface, all of the light incident surface, the first side surface, and the second surface are connected to the back surface, the back surface is configured for internally reflecting the light rays in the light guide plate.

5. The backlight module of claim 4, wherein the main body comprises a third side surface and a fourth side surface, both of the third side surface and the fourth side surface are connected to the light emitting surface and the bottom surface, the third side surface is parallel to the first side surface, and is connected to the second side surface, the fourth side surface is connected to the first side surface and the third side surface, the third surface and the fourth side surface are configured for reflecting the light rays in the light guide plate.

6. The backlight module of claim 1, wherein the protrusions and the main body are integrally formed with each other.

7. The backlight module of claim 1, wherein the light source is a light emitting diode.

* * * * *